(12) United States Patent
Han et al.

(10) Patent No.: US 8,688,136 B2
(45) Date of Patent: Apr. 1, 2014

(54) APPARATUS AND METHOD FOR SELECTING FREQUENCY ALLOCATION OF FEMTO BASE STATION

(75) Inventors: Ki-Young Han, Yongin-si (KR); Byoung-Ha Yi, Seoul (KR); Jae-Hyok Lee, Yongin-si (KR); Hyon-Goo Kang, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 646 days.

(21) Appl. No.: 12/592,005

(22) Filed: Nov. 18, 2009

(65) Prior Publication Data

US 2010/0136996 A1    Jun. 3, 2010

(30) Foreign Application Priority Data

Nov. 28, 2008 (KR) ........................ 10-2008-0119921

(51) Int. Cl.
*H04W 72/00* (2009.01)
*H04B 1/00* (2006.01)
*H04B 7/212* (2006.01)
*H04W 4/00* (2009.01)

(52) U.S. Cl.
USPC ....... 455/452.1; 455/63.1; 455/447; 370/337; 370/338

(58) Field of Classification Search
None
See application file for complete search history.

(56) References Cited

U.S. PATENT DOCUMENTS

| | | | |
|---|---|---|---|
| 6,885,651 B1* | 4/2005 | Young | 370/337 |
| 7,127,212 B2* | 10/2006 | Fattouch | 455/63.1 |
| 2002/0128014 A1* | 9/2002 | Chen | 455/447 |
| 2007/0097939 A1* | 5/2007 | Nylander et al. | 370/338 |

FOREIGN PATENT DOCUMENTS

KR    10-2008-0114227    12/2008

* cited by examiner

*Primary Examiner* — Jinsong Hu
*Assistant Examiner* — William Nealon

(57) ABSTRACT

A wireless communication network includes an apparatus and method for dynamically allocating frequencies of a femto Base Station (BS). An operation of the femto BS includes measuring received signal strength on system Frequency Allocations (FAs) of a plurality of macro BSs, determining maximum received signal strengths for the respective FAs, and determining an available FA set by using a result obtained from comparison between the maximum received signal strengths for the respective FAs with a first threshold.

30 Claims, 4 Drawing Sheets

APPARATUS AND METHOD FOR SELECTING FREQUENCY ALLOCATION OF FEMTO BASE STATION

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Nov. 28, 2008 and assigned Serial No. 10-2008-0119921, the entire disclosure of which is hereby incorporated by reference.

TECHNICAL FIELD OF THE INVENTION

The present invention relates to a wireless communication system. More particularly, the present invention relates to an apparatus and method for automatically allocating frequencies to maximize a throughput of a femto Base Station (BS) while minimizing an influence on a macro cell by the femto BS.

BACKGROUND OF THE INVENTION

In recent broadband wireless communication systems, installing more femto Base Stations (BSs) to complement a macro BS is considered. The femto BS is used as a home BS or a Small Office Home Office (SOHO) BS, which is installed in a region outside the coverage of the macro BS or a region where service quality is poor due to weak signal strength. The femto BS is classified into an office BS and an enterprise BS. Similarly to the macro BS, the femto BS provides a portable Internet service to a Mobile Station (MS). The femto BS is characterized by low power, small throughput, inexpensive cost, and so forth, which are optimized for a small-sized indoor environment such as home or SOHO.

Due to the characteristic (i.e., low power, small throughput, inexpensive cost, and so forth) of the femto BS, it is expected that the number of BSs to be installed will increase exponentially. Accordingly, persistent network optimization is required for frequent installation and removal of the femto BS. As a result, a function of automatically installing a BS to reduce network installation cost and a function of reading and applying configuration changes of neighbor femto BSs are required. For this, a standardization work named as a self organization network or a self configuration network is currently being conducted for a next generation mobile communication standard.

A femto BS that includes a function of automatic BS installation and a function of automatic network optimization has to provide an MS with a service by adaptively determining a Frequency Allocation (FA) for use, Transmit (Tx) power, a cell IDentifier (ID), and so forth, according to an installation environment, so that the femto BS can adaptively operate in a neighbor wireless environment during initial installation or operation.

Since the femto BS can operate according to the same system protocol as the macro BS, interference to a macro cell has to be negligible or minimized as much as possible. When a large number of femto BSs are installed without satisfying this requirement, the macro BS may be affected by interference caused by the femto BSs, and thus may not be able to properly operate.

Accordingly, there is a need for a method of automatically selecting an FA to minimize an influence on a macro cell while maximizing a throughput of a femto BS.

SUMMARY OF THE INVENTION

To address the above-discussed deficiencies of the prior art, it is a primary aspect of the present invention to provide a method for automatically selecting a Frequency Allocation (FA) of a femto Base Station (BS) to reduce interference to a macro cell during installation or operation of the femto BS in a wireless communication system.

Another aspect of the present invention is to provide a method for automatically selecting an FA to maximize an overall throughput of a femto BS during operation of the femto BS in a wireless communication system.

In accordance with an aspect of the present invention, a method for operating a femto BS in a wireless communication system is provided. The method includes measuring received signal strength on system FAs of a plurality of macro BSs, determining maximum received signal strengths for the respective FAs, and determining an available FA set by using a result obtained from comparison between the maximum received signal strengths for the respective FAs with a first threshold.

In accordance with another aspect of the present invention, a method for operating a Network Management System (NMS) in a wireless communication system is provided. The method includes receiving available FA sets of respective femto BSs, and determining an FA to be initially used by a first femto BS among at least one FA included in an available FA set of the first femto BS.

In accordance with another aspect of the present invention, a femto BS apparatus in a wireless communication system is provided. The apparatus includes a measurer configured to measure a received signal strength on system FAs of a plurality of macro BSs, and a controller configured to determine maximum received signal strengths for the respective FAs and configured to determine an available FA set by using a result obtained from comparison between the maximum received signal strengths for the respective FAs with a first threshold.

In accordance with another aspect of the present invention, an NMS apparatus in a wireless communication system is provided. The apparatus includes a communicator configured to receive available FA sets of respective femto BSs, and a controller configured to determine an FA to be initially used by a first femto BS among at least one FA included in an available FA set of the first femto BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Hereinafter, a method for automatically allocating frequencies of a femto Base Station (BS) in a communication system is provided. The communication system includes a macro BS that communicates with a Mobile Station (MS) by using a plurality of Frequency Allocations (FAs).

Figure 1:
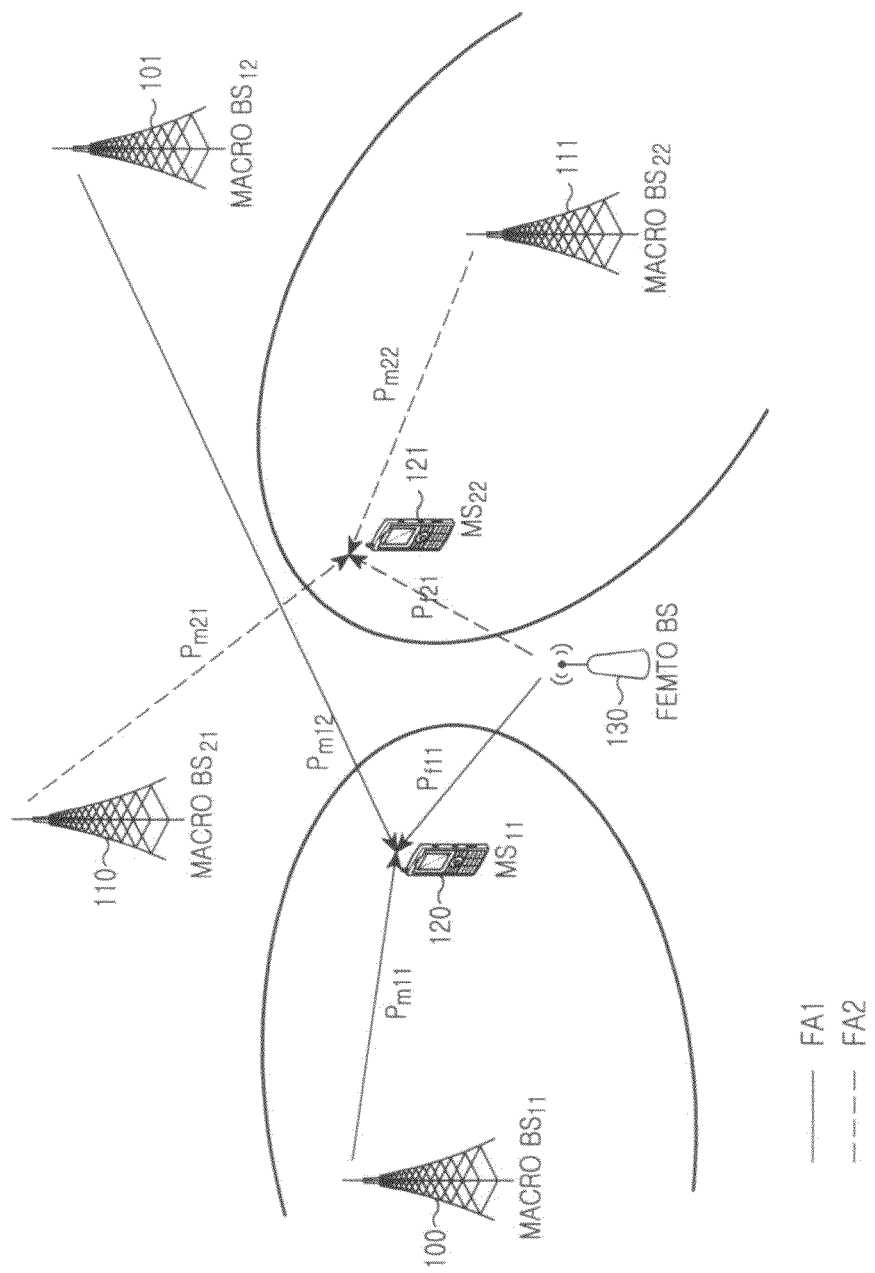
FIG. 1 illustrates a network configuration of a femto Base Station (BS) installed in an outdoor environment in a wireless communication system according to an exemplary embodiment of the present invention.

FIG. 1 illustrates a network of a system in which a macro BS and a femto BS coexist according to an exemplary embodiment of the present invention. The network of FIG. 1 is includes a plurality of macro BSs 100, 101, 110, and 111, MSs 120 and 121, and a femto BS 130.

The macro BSs 100, 101, 110, and 111 periodically transmit a preamble for synchronization setting of the MSs and information required to perform communication.

When the femto BS 130, installed in home, is powered on, the femto BS 130 automatically (for example, in response to the femto BS 130 powering on) receives information required for initial system setup (for example, Internet Protocol (IP) configuration, authentication, registration, image download, and so forth) from a Network Management System (NMS). Further, the femto BS 130 selects an FA for use. A process for selecting the FA will be described below in detail with reference to FIG. 2.

Referring to FIG. 1, when the femto BS 130 is installed, interference may occur to the $MS_{11}$ 130 and the $MS_{22}$ 121 located in a macro cell region. For convenience of explanation, four macro BSs, two MSs, and two FAs for use are illustrated in FIG. 1. However, this is for exemplary purposes only, and thus, the number of macro BSs, the number of femto BSs, the number of MSs, and the number of FAs for use may be greater than those numbers shown in the example of FIG. 1.

The macro $BS_{11}$ 100 and the macro $BS_{12}$ 101 can communicate with the $MS_{11}$ 120 by using an FA1. The macro $BS_{21}$ 110 and the macro $BS_{22}$ 111 can communicate with the $MS_{22}$ 121 by using an FA2. In this example, the femto BS 130 selects one of the two FAs (i.e., FA 1 and FA 2) during initial installation or operation of the femto BS 130. In FIG. 1, Pmxx denotes Receive (Rx) power for a signal received from a macro BSxx.

A basic principle capable of minimizing interference to the macro cell will be described.

When a macro BS communicates with an MS by using an FA1, an Rx Signal to Interference plus Noise Ratio (SINR) obtained before or after installation of a femto BS with respect to an MS existing inside the coverage of the macro BS is as follows. Equations 1a and 1b below shows an Rx SINR obtained before installation of the femto BS and an Rx SINR obtained after installation of the femto BS. Herein, Equations 1a and 1b below show a case where the femto BS uses the FA 1. If the femto BS uses an FA2, there is no interference to an MS that communicates using the FA1, and thus, the Rx SINR experienced by the MS is not affected before or after installation of the femto BS.

$$SINR_{bef,1} = \frac{P_{m11}}{P_{m12} + N} \quad \text{[Eqn. 1a]}$$

$$SINR_{aft,1} = \frac{P_{m11}}{P_{f11} + P_{m12} + N} \quad \text{[Eqn. 1b]}$$

In Equations 1a and 1b above, $SINR_{bef,1}$ denotes an Rx SINR obtained before installation of the femto BS of the MS; $SINR_{aft,1}$ denotes an Rx SINR obtained after installation of the femto BS of the MS; $P_{m11}$ denotes Rx power received by the MS from the macro $BS_{11}$ using the FA1; $P_{m12}$ denotes Rx power received by the MS from the macro $BS_{12}$ using the FA1; $P_{f11}$ denotes interference power received by the MS when the femto BS uses the FA1; and N denotes thermal noise power.

A ratio of SINRs obtained before and after installation of the femto BS is expressed by Equation 2:

$$SINR_{LossRatio} = \frac{SINR_{bef}}{SINR_{aft}} = \frac{P_{f11} + P_{m12} + N}{P_{m12} + N} = 1 + \frac{P_{f11}}{P_{m12} + N} \quad \text{[Eqn. 2]}$$

In Equation 2 above, $SINR_{LossRatio}$ denotes a ratio of SINRs obtained before and after installation of the femto BS; $SINR_{bef}$ denotes an Rx SINR obtained before installation of the femto BS of the MS; $SINR_{aft}$ denotes an Rx SINR obtained after installation of the femto BS of the MS; $P_{f11}$ denotes interference power received by the MS when the femto BS uses the FA1; $P_{m12}$ denotes Rx power received by the MS from the macro $BS_{12}$ using the FA1; and N denotes thermal noise power.

If the SINR ratio of Equation 2 above is great, it implies that a level of channel quality deterioration due to installation of the femto BS also is great. Therefore, in order to minimize interference to the macro cell, that is, in order to minimize an SINR loss of a macro MS, an FA of the femto BS is selected such that a result of Equation 3 below is minimized.

$$\frac{P_{f11}}{P_{m12}+N} \quad [\text{Eqn. 3}]$$

In Equation 3 above, $P_{f11}$ denotes interference power received by the MS when the femto BS uses the FA1; $P_{m12}$ denotes Rx power received by the MS from the macro $BS_{12}$ using the FA1; and N denotes thermal noise power Consequently, in order to minimize interference to the macro cell in the environment of FIG. 1, the FA to be used by the femto BS is determined by Equation:

$$\hat{F}_f = \arg\min_{FA1,FA2}\left\{\frac{P_{f11}}{P_{m12}+N}, \frac{P_{f21}}{P_{m22}+N}\right\} \quad [\text{Eqn. 4}]$$

In Equation 4 above, $\hat{F}_f$ denotes an FA to be used by the femto BS; $P_{f11}$ denotes interference power received by the MS when the femto BS uses the FA1; $P_{f21}$ denotes interference power received by the MS when the femto BS uses the FA2; $P_{m12}+N$ denotes Noise and Interference (NI) power excluding Rx power from the femto BS using the FA1; and $P_{m22}+N$ denotes NI power excluding Rx power from the femto BS using the FA2.

The NI power excluding Rx power from the femto BS includes a substantially similar value before and after installation of the femto BS. Thus, interference to the macro cell can be minimized when selecting an FA for minimizing Rx power $P_f$ of the femto BS. That is, to minimize Rx power of the femto BS for each FA, it is preferable to determine an FA of a macro cell farthest in distance from the femto BS as an FA of the femto BS.

In particular, in a case where there a plurality of macro cells using the same FA exists, if a macro BS having greatest Rx signal power is selected, a macro BS closest in distance from the femto BS is selected from the macro BSs using the same FA. If an FA of a macro BS that includes the smallest Rx signal power is used among macro BSs for each selected FA, the FA of the macro BS farthest in distance from the femto BS is used, and thus an FA for minimizing interference to the macro cell is selected.

Meanwhile, a basic principle of maximizing a throughput of the femto BS is as follows.

A total throughput of N femto BSs can be expressed by summing average throughputs of the respective femto BSs, as shown in Equation 5:

$$T_{sum} = \sum_{n=1}^{N} T_{avg,n} \quad [\text{Eqn. 5}]$$

In Equation 5 above, $T_{sum}$ denotes a sum of throughputs of femto BSs; N denotes the number of femto BSs; and $T_{avg,n}$ denotes an average throughput of an $n^{th}$ femto BS. $T_{avg,n}$ can be expressed by Equation 6 below. As shown in Equation 6 below, a throughput of each station is a function of SINR.

$$T_{avg,n} = \frac{1}{S_n}\int_{S_n}\int f(SINR_{x,y})dxdy = \quad [\text{Eqn. 6}]$$

-continued $$\frac{1}{S_n}\int_{S_n}\int f\left(\frac{P_{rx,n}(x,y)}{\sum_{l,l\neq n} g_{l,n}P_{rx,l}(x,y)+I_m(x,y)+N}\right)dxdy$$

In Equation 6 above, $T_{avg,n}$ denotes an average throughput of an $n^{th}$ femto BS; $S_n$ denotes a coverage area of $n^{th}$ BS; $P_{rx,n}(x,y)$ denotes Rx power for the $n^{th}$ femto BS when an MS is located in a position $(x,y)$; $P_{rx,l}(x,y)$ denotes Rx power for the $l^{th}$ femto BS when an MS is located in a position $(x,y)$; $I_m(x,y)$ denotes a sum of Rx power for macro BSs using the same FA as the $n^{th}$ femto BS when the MS is located in the position $(x,y)$; and $g_{l,n}$ denotes an indicator function which returns '1' when an $l^{th}$ femto BS and an $n^{th}$ femto BS use the same FA and otherwise returns '0'. The indicator function $g_{l,n}$ is expressed by Equation 7:

$$g_{l,n} = \begin{cases} 1, & f_l = f_n \\ 0, & f_l \neq f_n \end{cases} \quad [\text{Eqn. 7}]$$

In Equation 7 above, $g_{l,n}$ denotes an indicator function which returns '1' when an $l^{th}$ femto BS and an $n^{th}$ femto BS use the same FA and otherwise returns '0'; $f_l$ denotes the $l^{th}$ FA; and $f_n$ denotes the $n^{th}$ FA.

Therefore, an FA set for maximizing throughputs of a plurality of femto BSs is expressed by Equation 8:

$$F_{set} = \arg\max \sum_{n=1}^{N} \frac{1}{S_n}\int_{S_n}\int f\left(\frac{P_{rx,n}(x,y)}{\sum_{l,l\neq n} g_{l,n}P_{rx,l}(x,y)+I_m(x,y)+N}\right)dxdy \quad [\text{Eqn. 8}]$$

In Equation 8 above, $F_{set}$ denotes an FA set for maximizing throughputs of femto BSs; $S_n$ denotes a coverage area of $n^{th}$ BS; $P_{rx,n}(x,y)$ denotes Rx power for an $n^{th}$ femto BS when an MS is located in a position $(x,y)$; $g_{l,n}$ denotes an indicator function which returns '1' when an $l^{th}$ femto BS and an $n^{th}$ femto BS use the same FA and otherwise returns '0'; $P_{rx,l}(x,y)$ denotes Rx power for the $l^{th}$ femto BS when an MS is located in a position $(x,y)$; $I_m(x,y)$ denotes a sum of Rx power for macro BSs using the same FA as the $n^{th}$ femto BS when the MS is located in the position $(x,y)$; and N denotes noise power.

In general, NI power indicated by a denominator of Equation 8 above can be constant within a cell, and a condition that the NI power is constant is particularly effective when a shadowing effect is eliminated. Therefore, the NI power can be substituted with a sum of signals received by a femto BS directly from neighbor BSs. In this example, the NI power is not a variable that varies depending on the position $(x, y)$ but a constant within a cell of the $n^{th}$ femto BS, and thus does not have an effect on an FA set for maximizing a result of Equation 8 above. Accordingly, Equation 8 above can be summarized as Equation 9:

$$F_{set} = \arg\max \sum_{n=1}^{N}\left(\sum_{l,l\neq n} g_{l,n}P_{rx,n,l}+\right. \quad [\text{Eqn. 9}]$$

-continued $$\left. I_{m,n} + N \right]^{-1} \int_{S_n} \int S_n^{-1} P_{rx,n}(x,y) dx dy$$

$$= \operatorname{argmax} \sum_{n=1}^{N} \left( \sum_{l,l \ne n} g_{l,n} P_{rx,n,l} + \right.$$

$$\left. I_{m,n} + N \right]^{-1} \int_{S_n} \int \log S_n^{-1} P_{rx,n}(x,y) dx dy$$

In Equation 9 above, $F_{set}$ denotes an FA set for maximizing throughputs of femto BSs; $g_{l,n}$ denotes an indicator function which returns '1' when an $l^{th}$ femto BS and an $n^{th}$ femto BS use the same FA and otherwise returns '0'; $P_{rx,n,l}$ denotes Rx signal strength measured for an $l^{th}$ femto BS at an $n^{th}$ femto BS; $I_{m,n}$ denotes a sum of Rx power for a macro BS using the same FA as the $n^{th}$ femto BS; $S_n$ denotes a coverage area of $n^{th}$ BS; and $P_{rx,n}(x,y)$ denotes Rx power for the $n^{th}$ femto BS when an MS is located in a position (x,y).

In Equation 9 above, an integral term is a constant, that is, a specific value that does not vary irrespective of a size of a cell region. Thus, Equation 9 above can be expressed by Equation 10

$$F_{set} = \operatorname{argmax} \sum_{n=1}^{N} \left( \sum_{l,l \ne n} g_{l,n} P_{rx,n,l} + I_{m,n} + N \right)^{-1} \quad \text{[Eqn. 10]}$$

In Equation 10 above, $F_{set}$ denotes an FA set for maximizing throughputs of femto BSs; $g_{l,n}$ denotes an indicator function which returns '1' when an $l^{th}$ femto BS and an $n^{th}$ femto BS use the same FA and otherwise returns '0'; $P_{rx,n,l}$ denotes Rx signal strength measured for an $l^{th}$ femto BS at an $n^{th}$ femto BS; $I_{m,n}$ denotes a sum of Rx power for a macro BS using the same FA as the $n^{th}$ femto BS; and N denotes noise power.

In conclusion, by selecting an FA satisfying Equation 10 above, an FA for maximizing a throughput of a femto BS can be determined.

Figure 2:
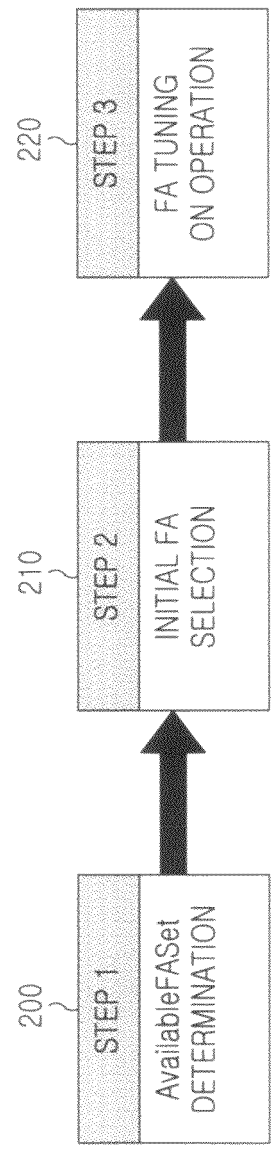
FIG. 2 illustrates a process of selecting a Frequency Allocation (FA) in a wireless communication system according to an exemplary embodiment of the present invention.

FIG. 2 illustrates a process of selecting an FA in a wireless communication system according to an exemplary embodiment of the present invention.

When a femto BS is newly installed in a state where a plurality of macro BSs communicate with MSs using a plurality of FA, the femto BS determines an available FA set in a first step, and thereafter selects an FA for use by selecting an initial FA in a second step and by tuning an FA during operation in a third step.

Referring to FIG. 2, the femto BS determines an available FA set that is a set of FAs usable by the femto BS in a system FA set received from a Network Management System (NMS) (step 200). Herein, the system FA set denotes a set of all FAs allocated to the system. All or some of system FA are allocated for the femto BS 130. A method for determining the available FA set is described below in detail with reference to FIG. 3.

Thereafter, the femto BS selects an initial FA capable of maximizing a throughput while minimizing an influence on a macro cell in the available FA set (step 210). In this example, the initial FA may be selected by the NMS.

Further, during operation of the femto BS, an FA capable of maximizing an indoor throughput while minimizing an influence on the macro cell may be periodically searched for from the available FA set so as to tune an FA for use (step 220). In this example, the FA for use may be tuned by the NMS.

Figure 3:
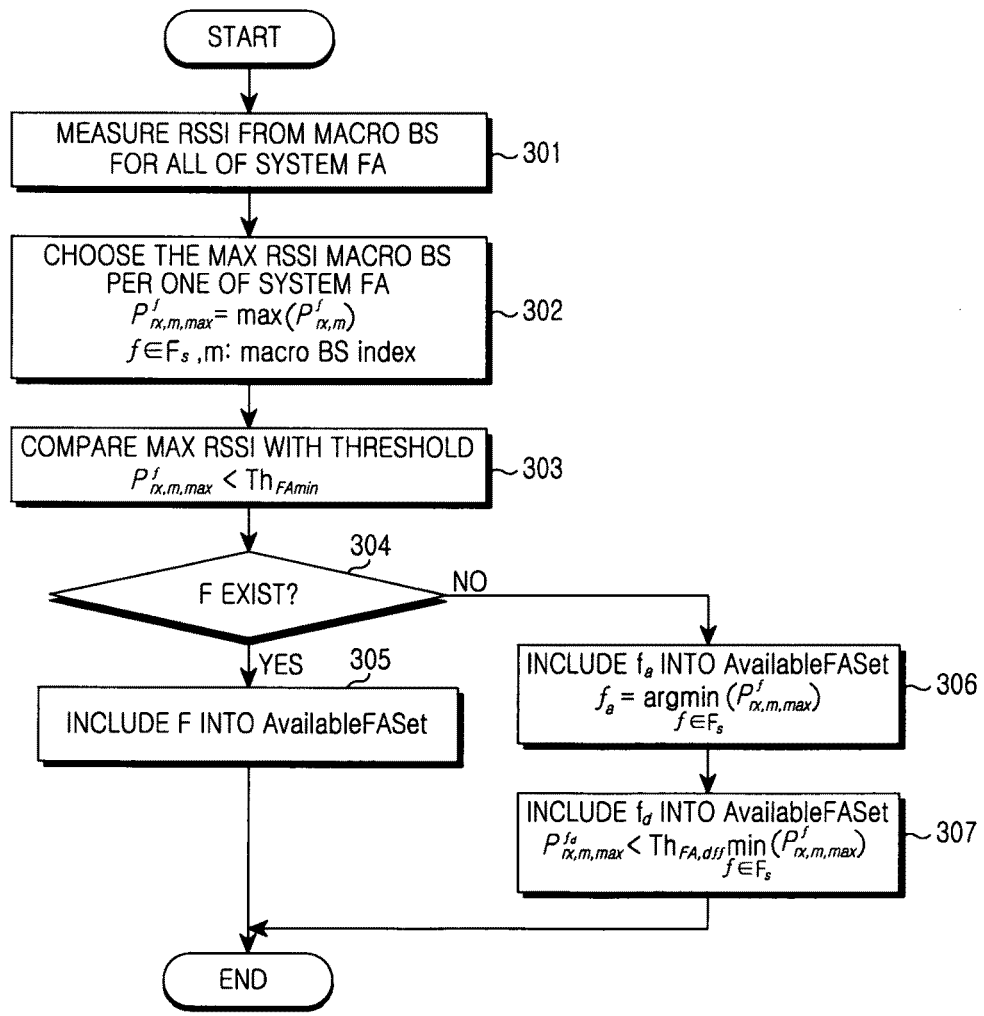
FIG. 3 illustrates a process of determining an available FA set of a femto BS in a wireless communication system according to an exemplary embodiment of the present invention.

FIG. 3 illustrates a process of determining an available FA set of a femto BS in a wireless communication system according to an exemplary embodiment of the present invention.

Referring to FIG. 3, when the femto BS is powered on, the femto BS measures a Received Signal Strength Indicator (RSSI) for each of all FAs using a preamble received from macro BSs (step 301).

Further, the femto BS obtains a maximum RSSI value of the macro BSs for each FA among system FAs (step 302). This is to select a macro BS which will cause strongest interference to the femto BS.

Thereafter, for each FA, the femto BS compares a maximum RSSI with a predetermined threshold $Th_{FA,min}$ (step 303). The threshold is an RSSI value that can ignore an interference influence on a macro cell even if the femto BS uses a frequency of a corresponding macro BS. The threshold is predetermined in a system, and may change optionally.

As a result of the comparison, the femto BS determines whether there is an FA having an RSSI less than the threshold $Th_{FA,min}$ (step 304), and includes FAs having RSSIs less than the threshold $Th_{FA,min}$ on the available FA set (step 305). As such, the available FA set is determined.

If the FA including the RSSI less than the threshold $Th_{FA,min}$ does not exist, the femto BS compares a maximum RSSI for each FA and thus includes an FA having a minimum RSSI on the available FA set (step 306).

Thereafter, the femto BS includes all FAs for which a difference between the RSSI of the FA including the minimum RSSI and a maximum RSSI of another FA is less than a threshold $Th_{FA,dif}$ on the available FA set (step 307).

Next, the second step of FIG. 2, that is, a process of determining an initial FA will be described.

After determining an available FA set by performing the process of FIG. 3, a femto BS removes a shadow factor of the femto BS by using a macro BS's RSSI reported by an MS. During operation of the femto BS, the femto BS can request the MS to perform measurement/report. However, since there is no MS to accept the request for measurement/report when the femto BS is newly powered on, Equation 10 above is modified into Equation 11 below. In Equation 11, a $k^{th}$ femto BS has to select an initial FA, and the remaining femto BSs cannot tune an FA for use since they are on operation.

$$\hat{f}_{i,k} = \arg\max_{f \in F_{a,k}} \sum_{n=1}^{N} \left( \sum_{l,l \ne n} g_{l,n} P_{rx,n,l} + I_m + N s_n \right)^{-1} \quad \text{[Eqn. 11]}$$

In Equation 11 above, $\hat{f}_{i,k}$ denotes an FA to be initially used by a $k^{th}$ femto BS; f denotes an FA candidate for use; $F_{a,k}$ denotes FA candidates for use; $g_{n,l}$ denotes an indicator function which returns '1' when an $l^{th}$ femto BS and an $n^{th}$ femto BS use the same FA and otherwise returns '0'; $P_{rx,n,l}$ denotes received signal strength measured by the $n^{th}$ femto BS for the $l^{th}$ femto BS; $I_{m,n}$ denotes received signal strength measured by an MS for macro BSs using the same FA as the $n^{th}$ femto BS; N denotes thermal noise; and $s_n$ denotes a shadowing factor for the $n^{th}$ femto BS.

When using Equation 11 above, a shadowing factor estimated in advance is used for a femto BS currently operating. However, as shown in Equation 12 below, a value of '1' is applied to the $k^{th}$ femto BS that does not include the estimated shadowing factor.

$$S_n = \begin{cases} 1, & n = k \\ S_n, & n \neq k \end{cases} \quad \text{[Eqn. 12]}$$

In Equation 12 above, $s_n$, denotes a shadowing factor for the $n^{th}$ femto BS.

Next, the third step of FIG. 2, that is, a process of determining an FA currently operating will be described.

Similarly to the second step, a basic idea is based on Equation 10 above. The third step differs from the second step in the following two aspects.

First, although a value of '1' is used in the second step since the $k^{th}$ femto BS does not include a shadowing factor value, a shadowing factor of the $k^{th}$ femto BS is estimated and used in the third step. Second, although Equation 10 above is optimized by tuning only an FA to be used by the $k^{th}$ femto BS in the second step, Equation 10 above is optimized in the third step by tuning FAs to be used by of all of N femto BSs.

In other words, when all of the N femto BSs have two FAs in an available FA set, a summation of Equation 10 above is calculated in the second step for the two FAs, but the summation of Equation 10 above is calculated in the third step for $2^N$ cases. In this case, a heuristic algorithm such as Tabu's search may be used to reduce computational complexity.

By considering the aforementioned explanation, FA determination can be expressed by Equation 13:

$$F_{set} = \arg \max_{\{f\} \in \{F_{a,k}\}} \sum_{n=1}^{N} \left( \sum_{l,l \neq n} g_{l,n} P_{rx,n,l} + I_m + Ns_n \right)^{-1} \quad \text{[Eqn. 13]}$$

In Equation 13 above, $F_{set}$ denotes an FA set for maximizing throughputs of femto BSs; $\{f\}$ denotes an FA set candidate to be used by the femto BSs; $\{F_{a,k}\}$ denotes FA set candidates to be used by the femto BSs; $g_{n,l}$ denotes an indicator function which returns '1' when an femto BS and an $n^{th}$ femto BS use the same FA and otherwise returns '0'; $P_{rx,n,l}$ denotes received signal strength measured by the $n^{th}$ femto BS for the $l^{th}$ femto BS; $I_{m,n}$ denotes received signal strength measured by an MS for macro BSs using the same FA as the $n^{th}$ femto BS; N denotes thermal noise; and $s_n$ denotes a shadowing factor for the $n^{th}$ femto BS.

As described above, during operation of a newly installed femto BS and femto BSs located in an existing network, FAs of the femto BSs can be tuned so that a sum of Rx power between the same FAs is minimized on the basis of Rx power for each FA of the femto BAs, that is, so that interference between the same FAs is decreased. Accordingly, a frequency band for maximizing throughputs of the femto BSs is allocated.

Figure 4:
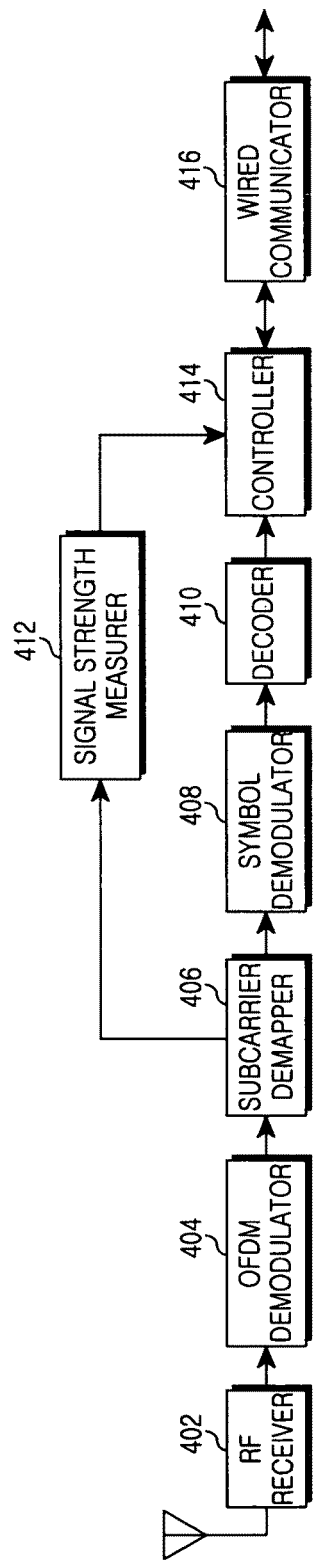
FIG. 4 illustrates a block diagram for a structure of a femto BS in a wireless communication system according to an exemplary embodiment of the present invention.

FIG. 4 illustrates a block diagram for a structure of a femto BS in a wireless communication system according to an exemplary embodiment of the present invention.

Referring to FIG. 4, the femto BS includes a Radio Frequency (RF) receiver 402, an Orthogonal Frequency Division Multiplexing (OFDM) demodulator 404, a subcarrier demapper 406, a symbol demodulator 408, a decoder 410, a signal strength measurer 412, a controller 414, and a wired communicator 416.

The RF receiver 402 down-converts an RF-band signal received through an antenna into a base-band signal. The OFDM demodulator 404 splits a signal provided from the RF receiver 402 in an OFDM symbol unit, removes a Cyclic Prefix (CP) from the signal, and restores complex symbols mapped to a frequency domain by performing a Fast Fourier Transform (FFT) operation. The subcarrier demapper 406 extracts the complex symbols mapped to the frequency domain, and classifies the complex symbols in a processing unit. The symbol demodulator 408 coverts the complex symbols into a bit-stream by performing demodulation. The decoder 410 performs channel decoding on the bit-stream to restore an information bit-stream.

The signal strength measurer 412 can measure strength of signals received from other BSs and MSs. In particular, according to the present invention, the signal strength measurer 412 measures an RSSI for each FA with respect to a preamble signal transmitted by other BSs, that is, macro BSs and femto BSs.

The controller 414 can provide overall control to the femto BS. For example, the controller 414 provides control so that an optimization process is performed under the instruction of an NMS. In particular, according to the present invention, the controller 414 selects an FA by performing the process of FIG. 2. An operation of selecting the FA will be described below in detail.

First, during initialization, that is, when power is on, the controller 414 determines RSSIs for respective FAs, and configures an available FA set by using at least one FA corresponding to an RSSI less than a predetermined reference value. Further, by using FAs belonging to the available FA set, the controller 414 determines an FA for use by performing Equation 11 above. Accordingly, the controller 414 provides control so that communication is achieved using the FA for use.

Thereafter, during operation, the controller 414 optimizes the FA for use either periodically or in an event-driven manner. That is, by performing Equation 13 above using all FAs belonging to available FA sets of all femto BSs, the controller 414 selects an FA set for maximizing throughputs of all femto BSs.

The wired communicator 416 can provide an interface for communication with network entities connected through a wired network. For example, the wired communicator 416 can provide the controller 414 with information (i.e., information of other BSs) required to perform optimization and received from the NMS. Further, the wired communicator 416 can transmit to the NMS optimization result information provided from the controller 414.

A structure of a femto BS and constitutional elements of the femto BS for FA selection have been described above with reference to FIG. 4. However, the FA selection may be performed by the NMS instead of the femto BS, and in this case, the NMS includes the controller 414. Additionally, the NMS includes the wired communicator 416 which receives available FA set information from femto BSs.

According to exemplary embodiments of the present invention, during installation and operation of a femto BS in a wireless communication system, frequency allocation is achieved to minimize on-frequency interference of an outdoor BS. Therefore, there is an advantage in that a system throughput can be maximized adaptively in an indoor BS environment while minimizing influence on the outdoor BS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a femto Base Station (BS) in a wireless communication system, the method comprising:
   measuring received signal strength on system Frequency Allocations (FAs) of a plurality of macro BSs;
   identifying maximum received signal strengths for the respective FAs;
   including in an available FA set each FA having a per-FA maximum received signal strength less than a first threshold; and
   when no FA has a per-FA maximum received signal strength less than the first threshold, including in the available FA set an FA having a smallest maximum received signal strength, identifying each FA for which a difference between a maximum received signal strength for the each FA and the smallest maximum received signal strength is less than a second threshold, and including in the available FA set each identified FA.

2. The method of claim 1, wherein measuring received signal strength on the system FAs comprises measuring the received signal strength on the system FAs when the femto BS is powered on.

3. The method of claim 1, wherein measuring received signal strength on the system FAs comprises measuring the received signal strength using a preamble received from each of the macro BSs.

4. The method of claim 1, further comprising:
   determining an FA for initial use among at least one FA included in the available FA set.

5. The method of claim 4, wherein the FA for initial use comprises an FA for maximizing a throughput of the femto BS among the at least one FA included in the available FA set.

6. The method of claim 5, wherein the FA for initial use comprises an FA for minimizing noise and interference power experienced by a Mobile Station (MS) among the at least one FA included in the available FA set.

7. The method of claim 4, further comprising:
   tuning the FA for use by determining an FA set while communication is performed using the FA for initial use.

8. A method for operating a Network Management System (NMS) in a wireless communication system, the method comprising:
   receiving from each of a plurality of femto Base Stations (BSs) available Frequency Allocation (FA) sets determined by the each of the plurality of femto BSs; and
   identifying an FA to be initially used by a first femto BS among at least one FA included in the available FA set of the first femto BS,
   wherein a first of the available FA sets comprises:
      an FA having a per-FA maximum received signal strength, estimated by the first femto BS, less than a first threshold,
      an FA having a smallest maximum received signal strength estimated by the first femto BS, if no FA has the per-FA maximum received signal strength less than the first threshold, and
   an FA for which a difference between a maximum received signal strength for the FA and the smallest maximum received signal strength is less than a second threshold, if no FA has the per-FA maximum received signal strength less than the first threshold.

9. The method of claim 8, wherein the FA for initial use comprises an FA for maximizing a throughput of the first femto BS among the at least one FA included in the first available FA set.

10. The method of claim 9, wherein the FA for initial use comprises an FA for minimizing noise and interference power experienced by a Mobile Station (MS) among the at least one FA included in the first available FA set.

11. The method of claim 8, further comprising:
    after identifying the FA to be initially used by the first femto BS, tuning the FAs to be used by the femto BSs by determining an FA set for the femto BSs.

12. An apparatus for a femto Base Station (BS) in a wireless communication system, the apparatus comprising:
    a measurer configured to measure received signal strength on system Frequency Allocations (FAs) of a plurality of macro BSs; and
    a controller configured to identify maximum received signal strengths for the respective FAs; to include in an available FA set each FA having a per-FA maximum received signal strength less than a first threshold; and when no FA has a per-FA maximum received signal strength less than the first threshold, to include in the available FA set an FA having a smallest maximum received signal strength, to identify each FA for which a difference between a maximum received signal strength for the each FA and the smallest maximum received signal strength is less than a second threshold, and to include in the available FA set each identified FA.

13. The apparatus of claim 12, wherein the measurer is configured to measure received signal strength on the system FAs when the femto BS is powered on.

14. The apparatus of claim 12, wherein the measurer is configured to measure received signal strength on the system FAs using a preamble received from each of the macro BSs.

15. The apparatus of claim 12, wherein the controller is further configured to determine an FA for initial use among at least one FA included in the available FA set.

16. The apparatus of claim 15, wherein the FA for initial use comprises an FA configured to maximize a throughput of the femto BS among the at least one FA included in the available FA set.

17. The apparatus of claim 16, wherein the FA for initial use comprises an FA for minimizing noise and interference power experienced by a Mobile Station (MS) among the at least one FA included in the available FA set.

18. The apparatus of claim 15, wherein, the controller is further configured to tune the FA for use by determining an FA set while communication is performed using the FA for initial use.

19. An apparatus for a Network Management System (NMS) in a wireless communication system, the apparatus comprising:
    a communicator configured to receive from each of a plurality of femto Base Stations (BSs) available Frequency Allocation (FA) sets determined by the each of a plurality of femto BSs; and
    a controller configured to identify an FA to be initially used by a first femto BS among at least one FA included in the available FA set of the first femto BS,
    wherein a first of the available FA sets comprises:
       an FA having a per-FA maximum received signal strength, estimated by the first femto BS, less than a first threshold,
       an FA having a smallest maximum received signal strength estimated by the first femto BS, if no FA has the per-FA maximum received signal strength less than the first threshold, and
    an FA for which a difference between a maximum received signal strength for the FA and the smallest maximum received signal strength is less than a second threshold, if no FA has the per-FA maximum received signal strength less than the first threshold.

20. The apparatus of claim 19, wherein the FA for initial use comprises an FA for maximizing a throughput of the first femto BS among the at least one FA included in the available FA set.

21. The apparatus of claim 20, wherein the FA for initial use comprises an FA for minimizing noise and interference power experienced by a Mobile Station (MS) among the at least one FA included in the first available FA set.

22. The apparatus of claim 19, wherein the controller is further configured, after identifying the FA to be initially used by the first femto BS, to tune the FAs to be used by the femto BSs by determining an FA set for the femto BSs.

23. The method of claim 7, wherein the FA for use is tuned so that a sum of received power from the macro BSs using a same FA as the FA for use is minimized.

24. The method of claim 4, further comprising:
updating the FA for use periodically.

25. The method of claim 11, wherein the FA for use is tuned so that a sum of received power from the macro BSs using a same FA as the FA for use is minimized.

26. The method of claim 8, further comprising:
updating the FA for use periodically.

27. The apparatus of claim 18, wherein the FA for use is tuned so that a sum of received power from the macro BSs using a same FA as the FA for use is minimized.

28. The apparatus of claim 15, wherein the controller is further configured to update the FA for use periodically.

29. The apparatus of claim 22, wherein the FA for use is tuned so that a sum of received power from the macro BSs using a same FA as the FA for use is minimized.

30. The apparatus of claim 19, wherein the controller is further configured to update the FA for use periodically.

* * * * *